April 28, 1959
W. P. MOSTELLER
2,883,918
PHOTOGRAPHIC LETTERING DEVICE
Filed Oct. 14, 1954
9 Sheets—Sheet 1
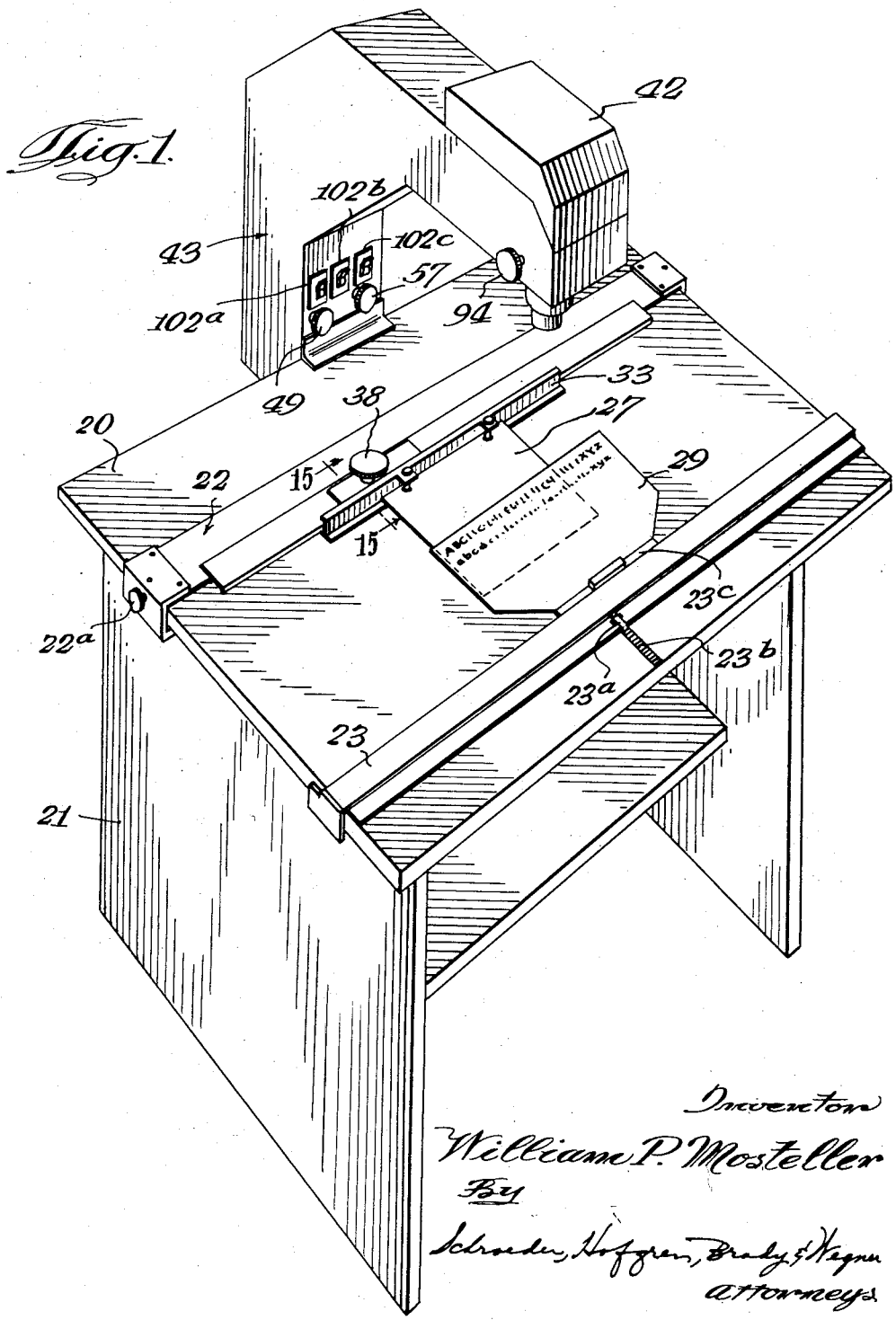

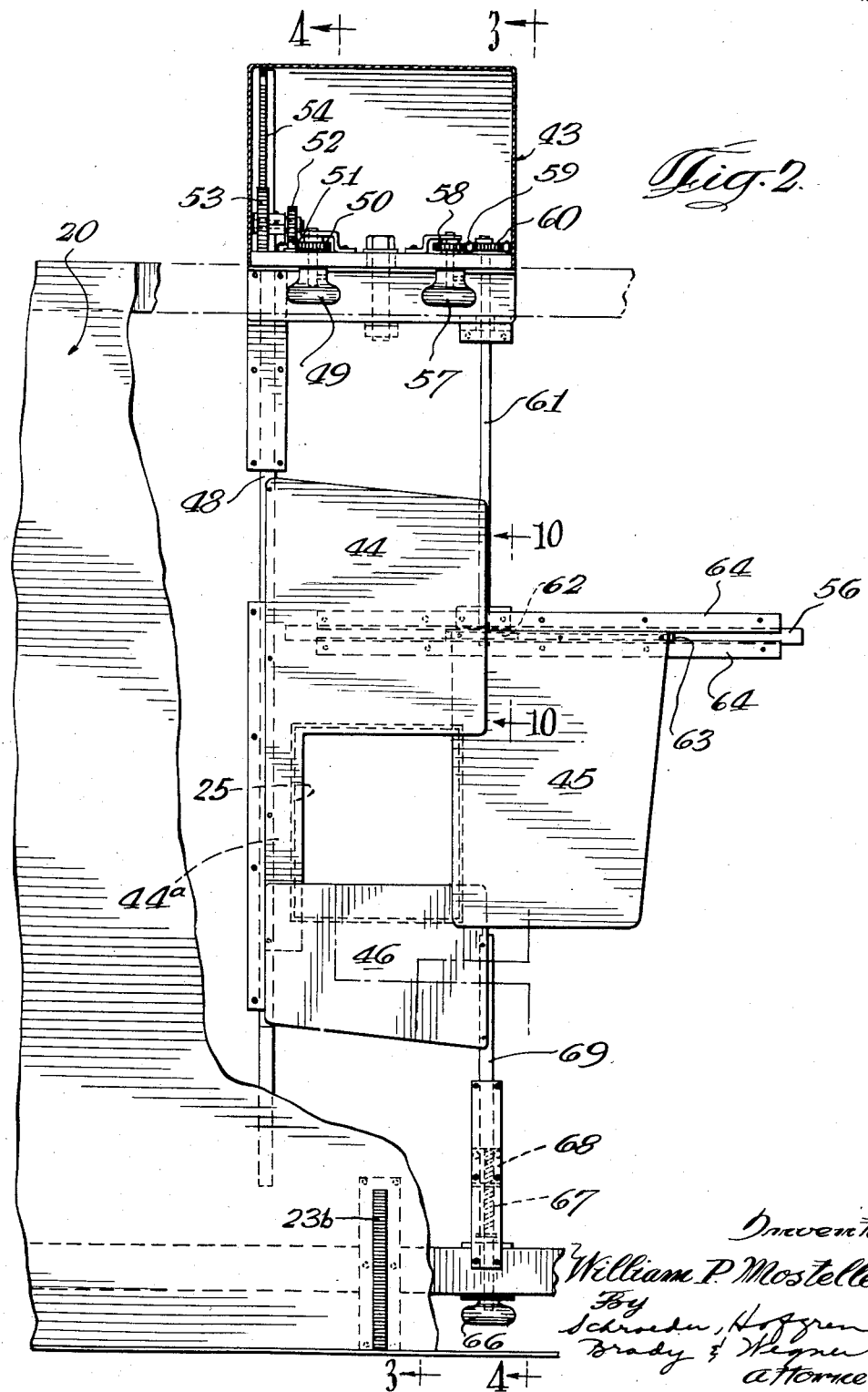

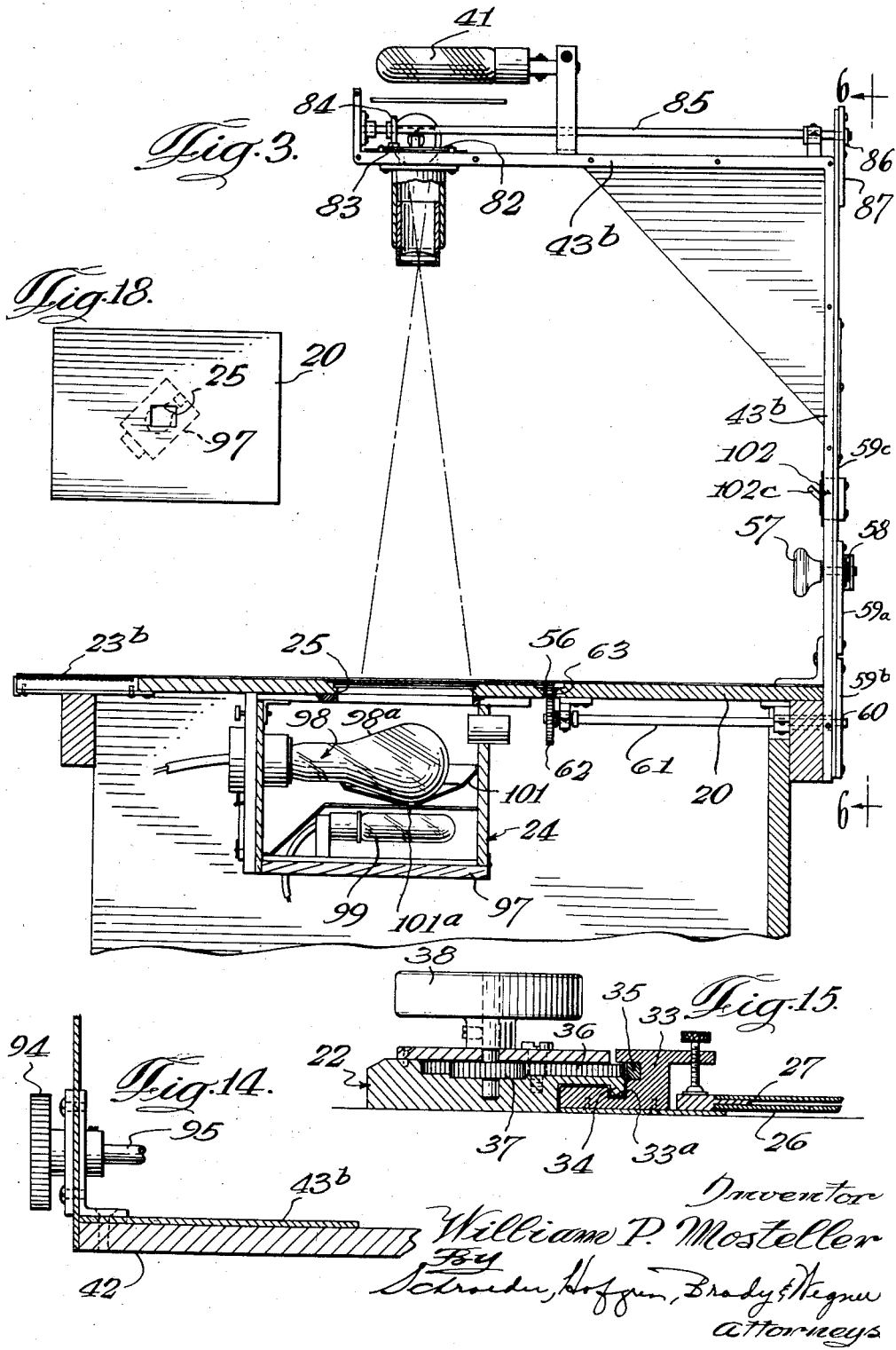

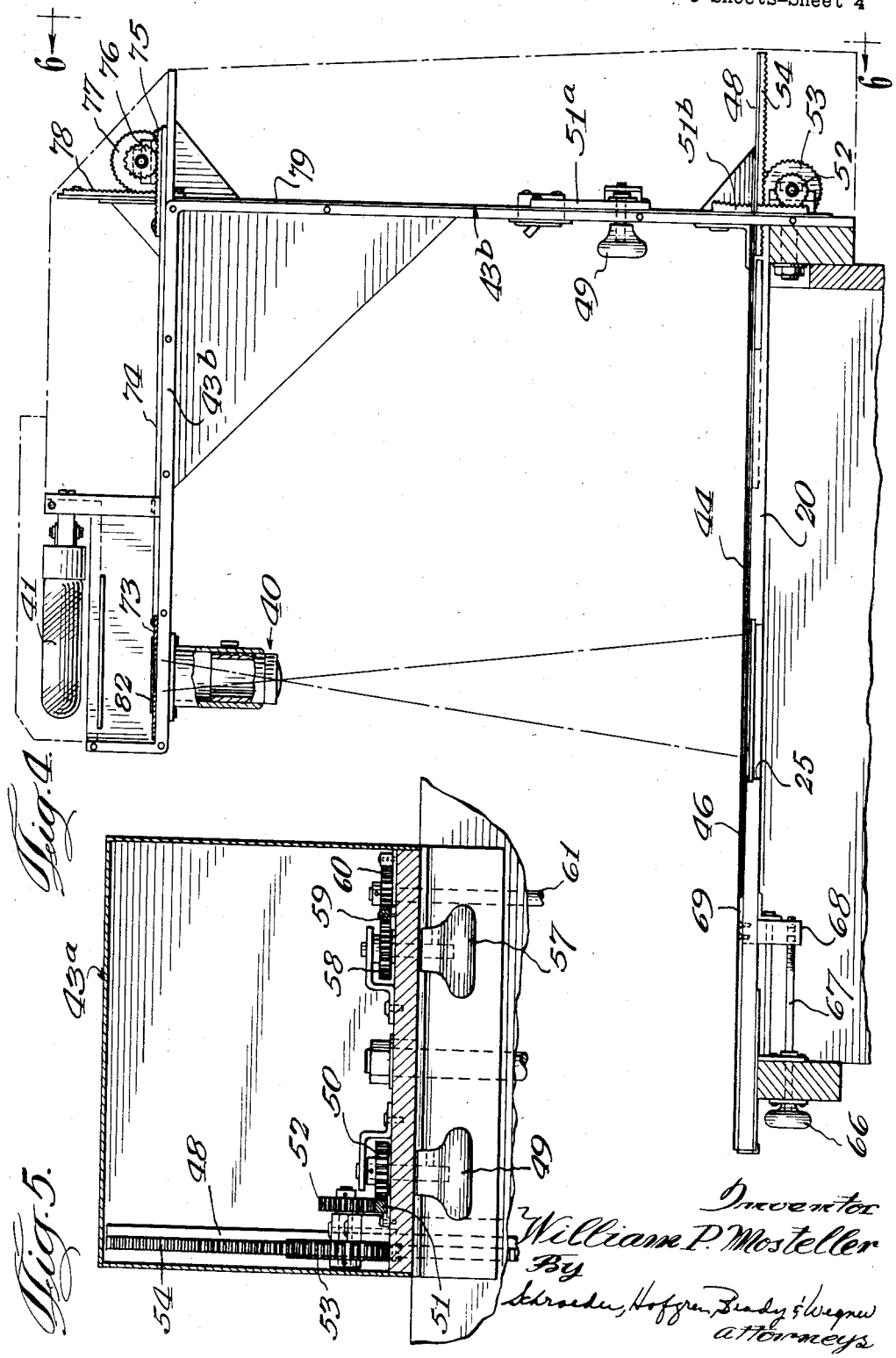

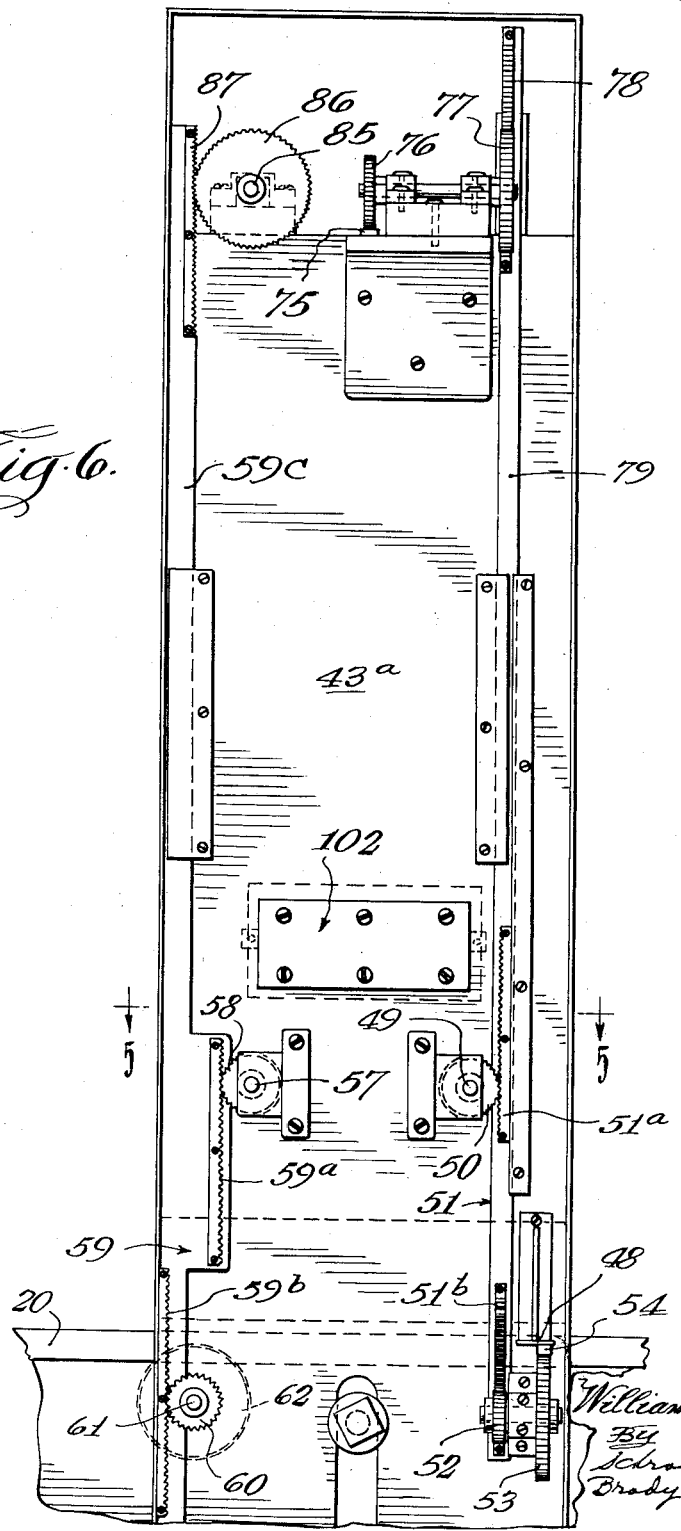

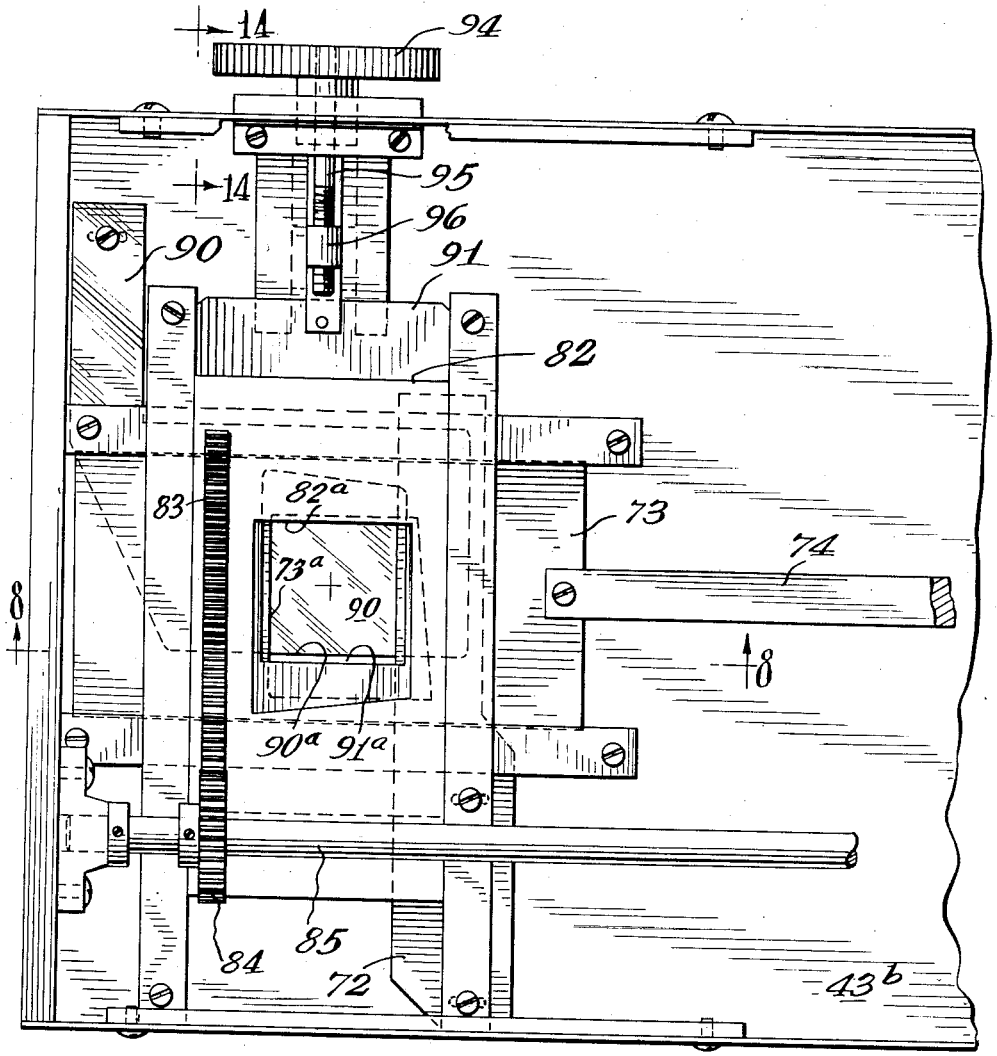
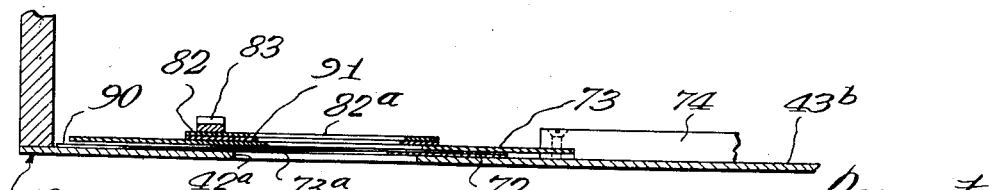

April 28, 1959  W. P. MOSTELLER  2,883,918
PHOTOGRAPHIC LETTERING DEVICE
Filed Oct. 14, 1954  9 Sheets-Sheet 7

Inventor
William P. Mosteller
By Schroeder, Hofgren, Brady & Wegner
Attorneys

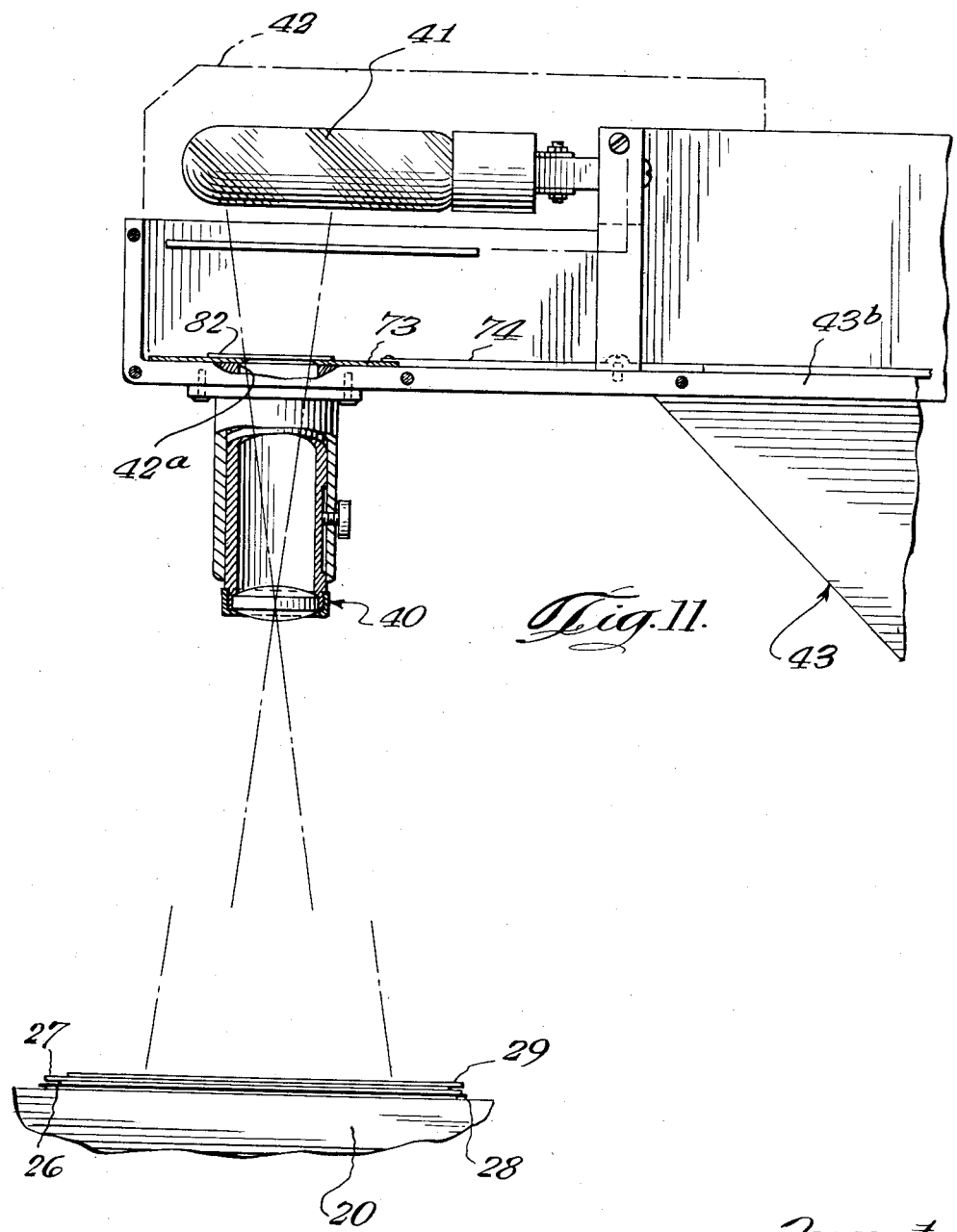

April 28, 1959 — W. P. MOSTELLER — 2,883,918
PHOTOGRAPHIC LETTERING DEVICE
Filed Oct. 14, 1954 — 9 Sheets-Sheet 9
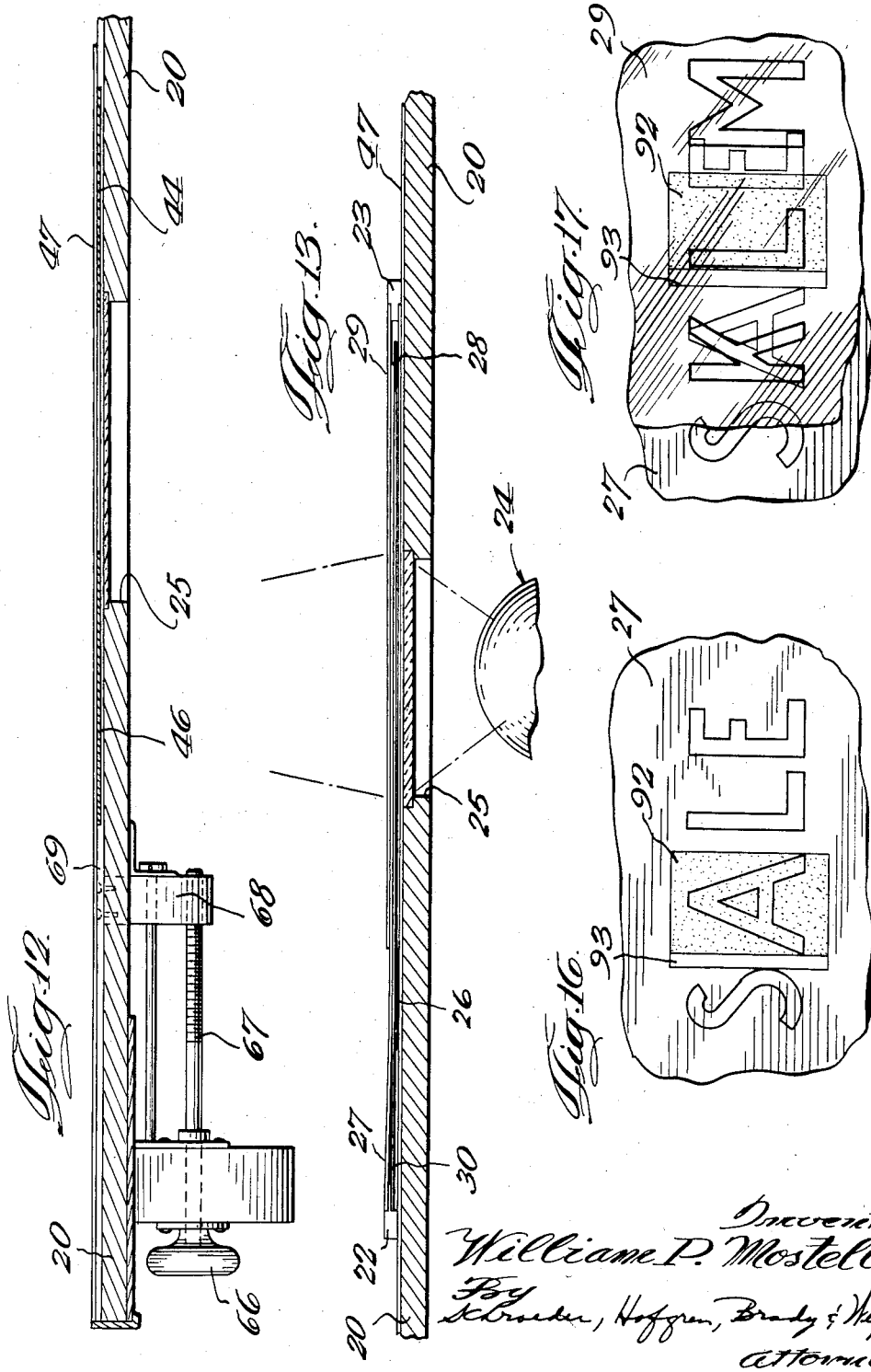

United States Patent Office 2,883,918
Patented Apr. 28, 1959

2,883,918

PHOTOGRAPHIC LETTERING DEVICE

William P. Mosteller, Los Angeles, Calif.

Application October 14, 1954, Serial No. 462,155

13 Claims. (Cl. 95—4.5)

This invention is concerned with a photographic printing apparatus and more particularly with a photographic printing apparatus which is adapted for the preparation of signs and placards.

This application is a continuation-in-part of my copending application Serial No. 164,199, filed May 25, 1950, now abandoned.

Many types of photographic printing apparatus of various kinds have been used and basically they include, in one form or another, a sheet of printing characters through which a printing light is directed onto a sensitized surface of film to print the desired characters in a desired configuration. Usually, an indexing system is incorporated to provide an indication of the character being printed and in some cases a layout is utilized to guide the printing operation. Most such apparatus, however, is limited in the kinds of printing paper which may be used and the styles of type available. I have devised, disclosed and claimed herein a novel and improved photographic printing apparatus which is easy to use, extremely accurate and very flexible in that almost any type of sensitized surface may be printed on and various forms of printing characters may be substituted.

One feature of the invention is that it provides a photographic printing apparatus comprising the source of printing light, means for holding printing means with a plurality of printing characters thereon in various light intercepting positions with respect to the printing light, means for holding printing character indexing means in fixed relation with the printing means, means for holding a light-sensitive surface in various light intercepting positions with respect to the printing light, a layout and indexing means for indicating the portions of the character indexing means and of the layout corresponding to the portions of the printing means and the light-sensitive surface intercepting the printing light.

Another feature is that means are provided for varying the configuration of the area of the printing light intercepted by the light sensitive surface. A further feature is that the indexing means indicating the portions of the character indexing means and the layout corresponding to the portions of the printing means and the light-sensitive surface intercepting the printing light is varied in accordance with the variations of the configuration of the light shining on the light-sensitive surface.

Still another feature is the provision, in a photographic printing apparatus including a printing light adapted to shine on a light-sensitive surface of means comprising, variable masking means associated with the printing light for varying the configuration of the area of light shining on the light-sensitive surface and indexing means for providing an indication of the area of the surface on which the light shines. Yet a further feature is that means are provided for simultaneously adjusting both the mask means and the indexing means.

Another feature is the provision in a photographic printing apparatus including a printing light adapted to shine on a light-sensitive surface of means comprising, variable mask means associated with the printing light for varying the configuration of the area of light shining on the light-sensitive surface, an indexing light and variable mask means associated with the indexing light, the indexing light providing an indication of the area of the surface on which the printing light shines.

Still a further feature is the provision in a photographic printing apparatus including a printing light adapted to shine on a light-sensitive surface for printing thereon a design made up of a plurality of prearranged characters, of means comprising, means for holding a layout of the design to be printed on the light-sensitive surface in fixed relation with such surface, indexing means for indicating on the layout the area thereof corresponding to the area of the surface on which the printing light shines and means for indicating on the layout a desired spacing between characters.

Yet another feature is the provision in a photographic printing apparatus for use with light-sensitive surfaces of various speeds of a printing light source comprising, a first light source of one intensity, a second light source of a different intensity, and selector means for energizing the desired one of these light sources.

Another feature is that the first light source includes an incandescent lamp of high intensity and having a transparent bulb, a reflector mounted behind the lamp and having an opening therein, and a low intensity light source mounted behind the reflector and shining through the opening and the transparent bulb onto the light sensitive surface.

Further features and advantages will readily be apparent from the following specification and from the drawings, in which:

Fig. 1 is a perspective view of the photographic printing apparatus;

Fig. 2 is a top plan view of the exposure mask arrangement;

Fig. 3 is a vertical sectional view taken along line 3—3 of Fig. 2;

Fig. 4 is a vertical sectional view taken along line 4—4 of Fig. 2;

Fig. 5 is a horizontal sectional view taken along line 5—5 of Fig. 6;

Fig. 6 is a rear elevational view of the upright portion of the apparatus taken along lines 6—6 of Figs. 3 and 4;

Fig. 7 is a top plan view of the index mask assembly;

Fig. 8 is a vertical sectional view taken along line 8—8 of Fig. 7;

Fig. 11 is a fragmentary elevation, partially in section, illustrating the operation of the printing apparatus;

Fig. 12 is a fragmentary sectional view taken through the table top;

Fig. 13 is a fragmentary sectional view through the table top illustrating the operation of the printing apparatus;

Fig. 14 is a vertical sectional view taken along line 14—14 of Fig. 7;

Fig. 15 is a fragmentary vertical sectional view taken along line 15—15 of Fig. 1;

Figs. 16 and 17 are diagrammatic views illustrating the operation of the character spacing indicator; and Fig. 18 is a reduced top plan view of the table top showing the relative position of the exposure opening and the exposure light.

Figure 9:
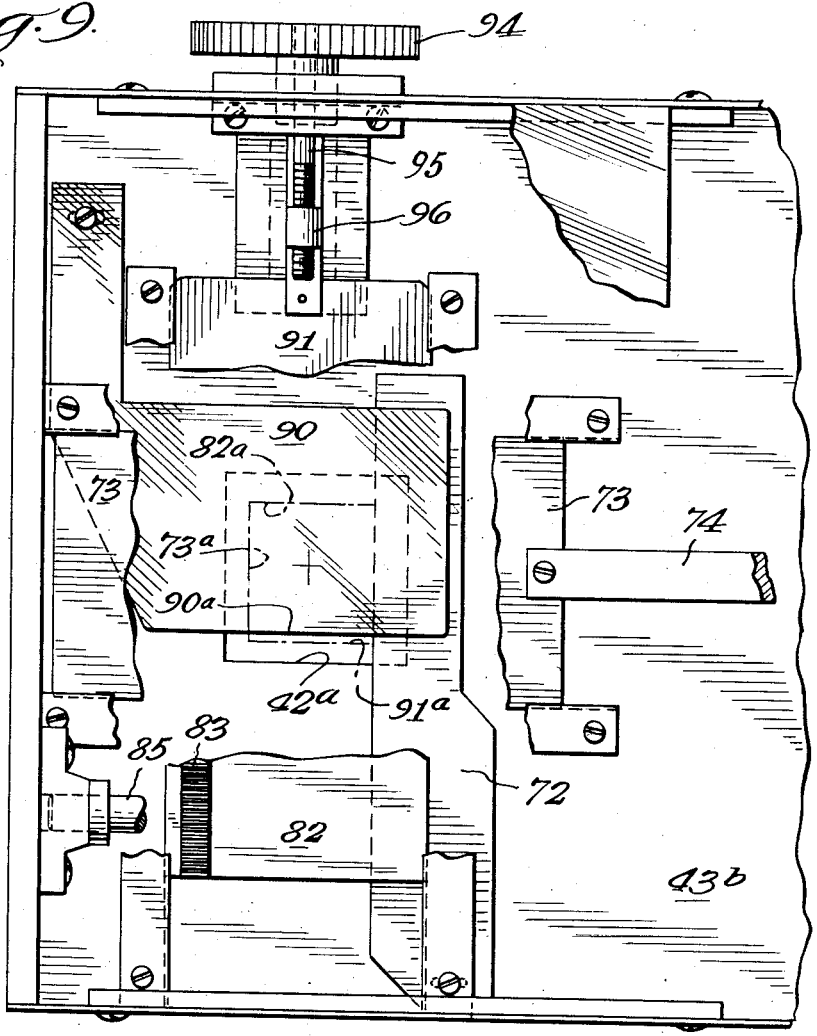
Fig. 9 is a view similar to Fig. 7 with a portion of the masks broken away.

The present photographic printing apparatus is particularly designed for preparation of posters, placards or the like either on conventional photographic printing paper or on specially prepared sheet material of almost any kind, treated with a suitable photosensitive coating. Practically any type of base material such as construction paper, cardboard, sheets of plastic or the like, on which a photosensitive coating may be applied, can be used in the apparatus. The printing characters which are utilized normally consist of the alphabet, the various numerals and other standard printing characters, but also may include special designs such as identifying marks, pictures or the like. The printing characters are provided in negative form on a sheet which is removably mounted in the apparatus and which may be changed to provide various type styles and designs as required. The configuration or arrangement of the various characters on the sensitized surface is limited only by the size of the apparatus.

Referring now to Fig. 1 of the drawings, the apparatus is illustrated in a preferred embodiment in which a table top or work surface 20 is mounted on a stand 21 which may be provided with means (not shown) for adjusting the angle of the table top to facilitate the use of the apparatus. Upper and lower straight edges, 22 and 23 respectively, are slidably mounted on the table top and are preferably provided with suitable means for maintaining them in parallelism and at right angles to the edges of the table top. A source of printing light, indicated generally at 24, is mounted on the underside of table top 20 and the light therefrom is projected upwardly through an opening 25 in the table top (Fig. 3).

Referring now also to Fig. 13, which illustrates the operation of the apparatus diagrammatically, it will be seen that two sheets of material are attached to and guided by each of the upper and lower straight edges 22 and 23. As shown in this figure, a sheet of opaque material 30 having a sheet of photosensitive material 26 secured to the undersurface thereof and a sheet 27 bearing a layout of the sign to be printed are attached to the upper straight edge 22 and are moved together in accordance with the movements thereof. Attached to the lower straight edge 23 is a first sheet 28 which bears the desired negative printing characters and which is positioned to lie between the sensitized sheet 26 and the printing light source 24. Also attached to straight edge 23 is the character index sheet 29 which overlies the layout sheet 27, the printing character sheet and the character index sheet are preferably in register and are movable together in accordance with the movements of the lower straight edge 23. The index sheet 29 may underlie the layout 27, which is often transparent, if desired.

In operating the apparatus, the sensitized sheet 26 and the layout 27 are first moved to such a position that the portion of the sensitized sheet on which a particular character is to be printed is aligned with opening 25. Preferably, corresponding portions of the layout and the sensitized sheet are in register. The character printing sheet and its associated character index sheet 29 are next positioned so that the proper character underlies the portion of the sensitized sheet 26 aligned with opening 25. The light source 24 is energized for an appropriate period of time, the light therefrom shining through opening 25 of the table top and the character printing sheet onto the sensitized sheet, printing the desired character thereon. The various sheets are then readjusted to permit printing of the next desired character and the process continued until the entire sign is completed.

It will be understood that the showings of the upper and lower straight edges and of the various sheets in Fig. 13 is intended for the purpose of illustrating the operation of the apparatus only, and that these elements may take various forms. For example, the various sheets may be inserted within clear plastic open ended envelopes which are permanently secured to the respective straight edges and the straight edges themselves may be constructed in two or more sections to permit sliding of the various sheets longitudinally therealong.

Referring once again to Fig. 1, the upper straight edge 22 is provided with a set screw 22a which permits clamping the straight edge in a desired position on the table top 20. For a similar reason straight edge 23 has mounted thereon a spring latch 23a which engages a notched plate 23b set in table top 20.

As mentioned briefly above, the various sheet assemblies are movable longitudinally of the straight edges 22 and 23. The sensitized surface 26 and layout sheet 27 are clamped to a bar 33 which is slidably movable along straight edge 22, as shown in Fig. 15. Bar 33 is provided with a groove 33a into which a tongue 34 on straight edge 22 is inserted, holding the bar 33 against the straight edge. A rack 35, mounted on bar 33 engages a pinion 36 mounted on straight edge 22 and driven through a spur gear 37 by movement of handwheel 38 to cause longitudinal displacement of the sensitized sheet 26 and layout 27 along the straight edge. The character printing sheet 28 and character index sheet 29 may be held by a separate clamping element 23c slidable along the lower straight edge 23.

In order to facilitate the correct positioning of, first, the sensitized sheet 26 and layout 27 and, second, the printing character sheet 28 and character index sheet 29, over opening 25 in the table top through which the printing light shines, an indexing arrangement is provided. Referring again to Fig. 11, it will be seen that an index light source 41 is mounted in a removable housing 42 positioned above the table top and carried by index assembly support 43. The index light shines through an opening 42a in the bottom of the housing and through an adjustable focusing lens 40 on the upper surface of the character index sheet 29, through which the layout sheet is also visible. The index light, thus, indicates on both the layout sheet 27 and the character index sheet 29 the relative position of the opening 25 in the table top through which the exposure light shines. It is a simple matter to move the two sheet assemblies into the proper position to print the desired character in the desired spot on the sensitized surface by merely so positioning the layout and character index sheet. The opaque sheet 30 shown in Fig. 13 prevents any possibility of reverse printing on the sensitized surface 26 resulting from either the effect of the index light or other light sources in the area in which the apparatus is used.

The various characters which may be printed with this apparatus vary widely in size and shape. In order to avoid exposing an area of the sensitized surface larger than that necessary to receive the character being printed, it is desirable to be able to alter the size and configuration of the exposed area as desired. For this purpose, the adjustable exposure mask assembly illustrated in Figs. 2, 3 and 4 is provided.

Three masks, 44, 45 and 46 are disposed about the opening 25 in the table top and may be adjusted to permit the desired restriction of the opening through which the exposure light shines. The masks are, preferably, of a thin sheet metal material and are inletted below the upper surface of the table and covered with a protective sheet 47 of plastic which is clear at least throughout the area of the opening 25 and the table top, but which may be opaque at either end.

The upper exposure mask 44 is provided with an extension 44a along the left side of opening 25 so that a single mask element serves as both the upper and left vertical mask. The mask 44 is mounted on a rod 48 which is movable transversely across the table top 20 to effect adjustment of the vertical dimension of the exposure opening. A vertical exposure adjustment knob 49 is mounted on the upright member 43a of the index support 43 and operates through a gear arrangement made up of a first pinion 50, a rack 51 comprising portions 51a and 51b (Figs. 4 and 6), pinion 52, pinion 53 mounted rotatably therewith and rack 54 secured to the end of rod 48 to provide the desired adjustment.

Figure 10:
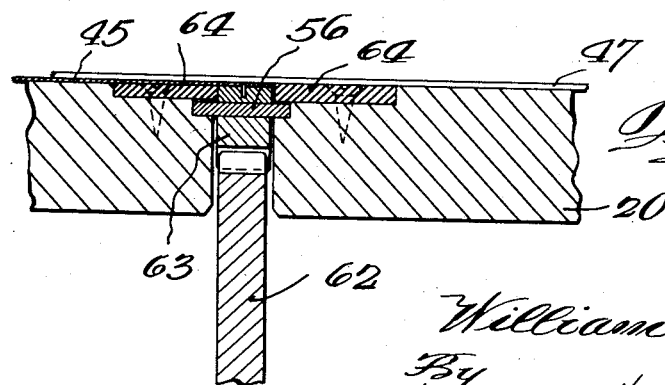
Fig. 10 is a fragmentary vertical sectional view taken along line 10—10 of Fig. 2.

Horizontally movable mask 45 is mounted on a rod 56 which is arranged for movement longitudinally of the table top 20. A horizontal mask adjustment knob 57 is mounted on the upright member 43a of the index support 43 adjacent the vertical control knob 49 and carries a pinion 58 which drives a rack 59 made up of two portions 59a and 59b, which last mentioned rack portion drives a pinion 60 carried on a shaft 61. The other end of shaft 61 carries a pinion 62 in engagement with a rack 63 mounted on the underside of rod 56 (Figs. 3, 6 and 10). It can be seen from Fig. 10 that a pair of plates 64 overlie a portion of the rod 56, preventing the rod 56 and the mask 45 from being forced upwardly by the action of pinion 62 on rack 63 during adjustment.

The base line or lower horizontal mask 46 may be placed in a fixed position or may be made adjustable as shown in the drawings where base line adjustment knob 66 carries a screw 67 which is threadably engaged with a collar 68 secured to a movable rod 69 carrying the base line mask. In operation, the base line mask will normally be set to a desired position and then left alone.

In order to make proper use of the indexing light it is necessary that means be provided for varying the area on which this light shines in accordance with the variations made in the exposure opening by manipulation of vertically movable mask 44 and horizontally movable mask 45. Referring to Figs. 7, 8 and 9, it will be seen that a somewhat similar mask arrangement is provided in connection with the index light opening 42a.

A fixed base line mask 72 is positioned along the upper edge of the opening 42a (that is the edge away from the operator of the apparatus) and is adjusted together with base line mask 46 so that the edge of the index light beam strikes the edge of the base line mask. It will be noted that the operative edges of the index light masks are reversed in position from the corresponding edges of the explosure light masks due to the inversion of the index light beam by lens 40.

A vertically movable mask 73 which has an operative edge 73a at the lower edge of opening 42a, is connected to an operating rod 74 which extends along the horizontal extension 43b of the index assembly support 43. A rack 75 is mounted at the rear end of rod 74 and engages a pinion 76 mounted on the same shaft with another pinion 77 which engages a rack 78. The rack 78, in turn, is mounted on a rod 79 which extends downwardly along the upright portion 43a of the support 43 and is connected to rack 51 controlled by vertical mask adjusting knob 49. The various pinions are so chosen that manipulation of the control knob 49 causes simultaneous movement of both the vertical exposure mask 44 and the vertical index mask 73 in such a manner that the vertical dimension of the index beam always corresponds with the vertical dimension of the exposure opening.

A horizontal index mask 82 is provided which has an operative edge 82a on the left side of the index light opening (as viewed by the operator) and corresponding with the edge of horizontally movable exposure mask 45 disposed along the right side of the exposure opening. A rack 83 mounted on the horizontal index mask 82 is engaged by a pinion 84 mounted on shaft 85 which extends back along the horizontal portion 43b of the index assembly support. A pinion 86 mounted at the rear of shaft 85 engages a rack 87 carried by an upwardly projecting extension 59c of rack 59. Thus, manipulation of horizontal mask adjustment knob 57 simultaneously effects the necessary adjustment of the horizontal exposure mask 45 and the horizontal index mask 82 maintaining the right edge of the index light area in the proper relation with the right edge of the exposure opening.

A transparent, colored mask 90 forms a part of the index mask arrangement and has its right edge 90a positioned so that the line caused thereby lies along the fixed left margin of the exposure opening provided by the portion 44a of mask 44. A space indicator mask 91 is also provided and has an operative edge 91a lying to the right of the edge 90a of the colored mask 90. It will be apparent that this mask arrangement will result in the provision of an index beam of light which has a relatively large section which is colored by the mask 90 and a narrow band of white light along the left edge thereof. This is shown in Figs. 16 and 17 where the colored area is indicated by the reference numeral 92 and the narrow band of white light by the numeral 93. The spacing indicator mask 91 may be moved to vary the width of the band of white light 93 by operation of a knob 94 on the side of the index assembly housing 42 which has a screw 95 connected thereto, the screw engaging a threaded collar 96 which is, in turn connected to the mask 91. It will be recalled that the left edge of the colored area of the index light corresponds with the left edge of the exposure opening and, thus, the band of white light 93 will lie to the left of the exposure opening.

The operation of the spacing indicator will be described in connection with Figs. 16 and 17. In Fig. 16 a portion of a layout sheet 27 bearing the word "Sale" is shown. The character index sheet 29 is not shown in Fig. 16 for the purposes of clarity. It will be assumed that the letter "S" has already been printed and it is now desired to print the letter "A." First, the spacing indicator mask 91 is adjusted by operation of the control knob 94 to provide a band of white light 93 corresponding with the desired spacing between the letters S and A, which, of course, are only roughly indicated on the layout. The layout sheet 27, together with the sensitized sheet or film 26 are positioned so that the left edge of the band of light 93 touches the right edge of the previously printed letter. The horizontally movable exposure mask 45, and, of course, the horizontal index mask 82 are then adjusted so that the next letter to be printed just fills the area 92 of the index light. With this setting the exposure opening will be of the proper size to print the letter "A."

Turning now to Fig. 17, the letter "A" has been printed, and the layout 27 and sensitized sheet 26 have been shifted to the left and the character sheets 28 and 29 have been positioned so that the letter "L" is ready for exposure. Again, the left edge of the band of white light 93 touches the right edge of the letter just printed, "A," and the next letter to be printed, "L," is adjacent the left edge of the colored area of light 92. As the letter "L" is substantially narrower than the letter "A," the area of colored light 92 is substantially larger than that needed for the exposure of the letter "L" and the masks may be adjusted to provide the proper exposure opening.

Turning now to Fig. 3, it will be seen that the source of exposure light 24 includes a housing 97 secured to the underside of table top 20 and having mounted therein two light sources 98 and 99, each being an incandescent lamp. A tubular coupling 100 is provided through the wall of housing 97 to permit the attachment of a blower (not shown).

The lamp 98, preferably, has a rather high intensity and further has a transparent bulb 98a, the purpose of which will be discussed later. A reflector 101 is mounted behind the lamp 98 to concentrate and direct substantially all of the light therefrom upwardly through the exposure opening 25. The lamp 98 will be used when it is desired to print material on a relatively slow speed printing surface, such as sometimes found with specially coated materials.

The second light source 99 is mounted behind the reflector 101, which is provided with an opening 101a, and is of relatively low power. The light from the source 99 shining through the opening 101a in the reflector provides substantially a point source of light for use with high speed photographic printing material. Inasmuch as the bulb 98a of the lamp 98 is transparent, the light from source 99 will pass therethrough without interference, this arrangement permitting the use of two sources of differing intensity without the necessity for changing the lamps.

As shown in Fig. 18, the light source housing 97 is preferably mounted diagonally under the exposure opening 25 in order that the point source of light provided by lamp 99 shining through opening 101a in the reflector will be as nearly centrally positioned of the exposure opening as possible regardless of the size thereof.

The two lamps 98 and 99 are selectively energized as desired through the operation of switches 102a and 102b, mounted on index support 43. A variable output transformer may be used to provide a fine control over the intensity of each exposure light source, and, if desired, an automatic timer may also be incorporated in the circuit. The third switch 102c of the switch assembly 102 controls the energization of the index light source 41.

While I have shown and described certain embodiments of my invention, it is to be understood that it is capable of many modifications. Changes, therefore, in the construction and arrangement may be made without departing from the spirit and scope of the invention as defined in the appended claims.

I claim:

1. In a photographic printing apparatus having means to hold a printing sheet with a plurality of characters thereon in various intercepting printing positions relative to a printing light and means to hold a light-sensitive sheet in various exposure positions relative to the printing light, the combination therewith of; an index sheet member having the same pattern of characters thereon as said printing sheet; means to hold said index sheet member in fixed relation to said printing sheet; means to hold a layout sheet member in fixed relationship with said light-sensitive sheet and face to face with said index sheet member with the same positional relationship between the index sheet member and the layout sheet member as exists between the printing sheet and the light-sensitive sheet; and means to project an index beam of light on one of said two sheet members to illuminate a portion thereof, said one sheet member being of light transmitting character to permit said light beam to illuminate a portion of the other of the two sheet members, said illuminated portions of the two sheet members being positioned and dimensioned to correspond to portions of said printing sheet and said light-sensitive sheet positioned for illumination by said printing light.

2. A photographic printing apparatus as set forth in claim 1 which includes one control means to move said printing sheet and said index sheet member in unison and a second control means to move said light-sensitive sheet and said layout sheet member in unison.

3. A photographic printing apparatus as set forth in claim 1 which includes adjustable printing aperture means to vary the effective cross-sectional area of printing light intercepted by the printing sheet and light-sensitive sheet and includes means to vary the effective cross-sectional area of said index beam accordingly.

4. A photographic printing apparatus as set forth in claim 1 in which opaque means separates said printing sheet and light-sensitive sheet, on one hand, from said index sheet member and layout sheet member, on the other hand, with said index sheet member substantially in register with said printing sheet and said layout sheet member substantially in register with said light-sensitive sheet.

5. A photographic printing apparatus as set forth in claim 4 in which means fixed relative to said opaque means holds said light-sensitive sheet and the opaque means is in fixed relation to the means to hold said layout sheet member.

6. In a photographic printing apparatus of the character described, the combination of: a source of printing light; means to hold a light-sensitive sheet above said light source; printing aperture means above said light source to limit the projection of said printing light onto the underside of said light-sensitive sheet to an area of a given configuration and size, said sheet-holding means being movable to vary the position on said light-sensitive sheet of said area of projection of the printing light; means to hold a printing sheet with a plurality of characters thereon in various printing positions between said light-sensitive sheet and said printing aperture means whereby the printing light passes upward through the printing aperture means and said printing sheet to said light-sensitive sheet; an index sheet having the same pattern of characters thereon as said printing sheet; means to hold said index sheet above said light-sensitive sheet in fixed relation to said printing sheet; an indexing aperture means above said index sheet; and means to project an index beam of light downward through said indexing aperture means onto said indexing sheet to illuminate an area thereon corresponding to the portion of said printing sheet that intercepts the printed light projected upward onto said light-sensitive sheet for guidance in positioning the printing sheet relative to said printing aperture means.

7. In a photographic printing apparatus having means to hold a printing sheet with a plurality of characters thereon in various intercepting printing positions relative to a printing light and means to hold a light-sensitive sheet in various exposure positions relative to the printing light, the combination therewith of: printing aperture means to limit the projection of said light onto said light-sensitive sheet through said printing sheet to an area of a given configuration and size; an index sheet having the same pattern of characters thereon as said printing sheet; opaque means normally separating said index sheet and said printing sheet from each other; means to hold said index sheet substantially in register with said printing sheet; and indexing aperture means to outline an area on said index sheet of the same size as said first-mentioned area with the outlined area registered with said first-mentioned area for guidance in positioning the printed sheet relative to the printing light.

8. In a photographic printing apparatus of the character described, the combination of: a source of printing light; means to hold a light-sensitive sheet above said light source; printing aperture means above said light source to limit the projection of said printing light onto the underside of said light-sensitive sheet to an area of a given configuration and size, said sheet-holding means being movable to vary the position on said light-sensitive sheet of said area of projection of the printing light; means to hold a printing sheet with a plurality of characters thereon in various printing positions between said light-sensitive sheet and said printing aperture means whereby the printing light passes upward through the printing aperture means and said printing sheet to said light-sensitive sheet; means to hold a layout sheet corresponding to said light-sensitive sheet above the light-sensitive sheet in fixed relation thereto; an indexing aperture means above said layout sheet; and means to project an index beam of light downward through said indexing aperture means onto said layout sheet to illuminate an area thereon corresponding to said area of printing light projection onto said light-sensitive sheet for guidance in positioning the light-sensitive sheet relative to said printing aperture means.

9. In a photographic printing apparatus having means to hold a printing sheet with a plurality of characters thereon in various intercepting printing positions relative to a printing light and means to hold a light-sensitive sheet in various exposure positions relative to the printing light, the combination therewith of: printing aperture means to limit the projection of said light onto said light-sensitive sheet to an area of a given configuration and size; means to hold a layout sheet corresponding to said light-sensitive sheet in position registered with the light-sensitive sheet; opaque means separating said layout sheet from said light-sensitive sheet; and an indexing aperture means above said layout sheet to outline an area on the layout sheet of the same size and configuration as said first-mentioned area of printing light projection onto said light-sensitive sheet for guidance in positioning the light-sensitive sheet relative to said printing aperture means.

10. A photographic printing apparatus, comprising: a source of printing light; means for holding printing means with a plurality of printing characters thereon in various light intercepting positions with respect to said printing light; means for holding printing character indexing means in fixed relation with said printing means; means for holding a light sensitive surface in various light intercepting positions with respect to said printing light; means for holding a layout in fixed relation with said light sensitive surface; means for varying the configuration of the light shining on said light sensitive surface; indexing means for indicating the portions of the character indexing means and of the layout corresponding to the portions of the printing means and the light-sensitive surface intercepting the printing light; and means operable as a function of said variable means for varying said indexing means in accordance with the variation of the configuration of the light shining on said light sensitive surface.

11. In a photographic printing apparatus including a printing light adapted to shine on a light-sensitive surface, means of the character described, comprising: variable mask means associated with said printing light for varying the configuration of the area of light shining on the said surface; an indexing light; variable mask means associated with said indexing light, said indexing light providing an indication of the area of said surface on which said printing light shines; and means for simultaneously adjusting both of said mask means.

12. In a photographic printing apparatus including a printing light adapted to shine on a light-sensitive surface for printing thereon a design made up of a plurality of prearranged characters, means of the character described, comprising: means for holding a layout of the design to be printed on said surface in fixed relation with said surface; indexing means for indicating on said layout the area thereof corresponding to the area of said surface on which said printing light shines; means forming a part of said indexing means, for indicating on said layout an area corresponding to a desired spacing between characters; and means for varying the spacing indicating area to permit indication of different spacings between characters.

13. In a photographic printing apparatus including a printing light adapted to shine on a light-sensitive surface for printing thereon a design made up of a plurality of prearranged characters, means of the character described, comprising: means for holding a layout of the design to be printed on said surface in fixed relation with said surface; indexing means for shining light of a first color on said layout, the area of said light corresponding to the area of the light-sensitive surface on which the printing light shines; and means for shining a different color light on an area of said layout corresponding to a desired spacing between the characters.

References Cited in the file of this patent
UNITED STATES PATENTS

| | | |
|---|---|---|
| 1,237,239 | Bunnell | Aug. 14, 1917 |
| 1,893,439 | Ogden | Jan. 3, 1933 |
| 1,894,004 | Rose | Jan. 10, 1933 |
| 1,980,287 | Ogden | Nov. 13, 1934 |
| 2,085,580 | Gottlieb | June 29, 1937 |
| 2,095,815 | Hopkins | Oct. 12, 1937 |
| 2,160,750 | Mayer | May 30, 1939 |
| 2,247,104 | Takacs | June 24, 1941 |
| 2,685,830 | Robins | Aug. 10, 1954 |
| 2,687,072 | Lohr | Aug. 24, 1954 |
| 2,706,436 | Scott | Apr. 19, 1955 |
| 2,725,802 | Snyder | Dec. 6, 1955 |